United States Patent [19]
Coulson

[11] 3,914,311
[45] Oct. 21, 1975

[54] PREPARATION OF AROMATIC SECONDARY AND TERTIARY AMINES USING A NICKEL COMPLEX CATALYST

[75] Inventor: Dale Robert Coulson, Wilmington, Del.

[73] Assignee: E. I. Du Pont de Nemours & Company, Wilmington, Del.

[22] Filed: June 15, 1973

[21] Appl. No.: 370,285

[52] U.S. Cl. ............... 260/577; 260/267; 260/269; 260/279 R; 260/293.51; 260/293.67; 260/293.68; 260/293.69; 260/293.72; 260/296 R; 260/347.7; 260/326.8; 260/326.81; 260/329 R; 260/329 AM; 260/576

[51] Int. Cl.$^2$ ................ C07C 87/52; C07C 87/54; C07C 87/56; C07C 87/64

[58] Field of Search ............ 260/578, 581, 580, 577

Primary Examiner—Lewis Gotts
Assistant Examiner—S. P. Williams
Attorney, Agent, or Firm—Anthony P. Mentis

[57] ABSTRACT

Aromatic amines are prepared by catalyzing the reaction between a mono- or dialkyl-amine and an aromatic halide with a nickel complex. Exemplary is the reaction of chlorobenzene and dimethylamine in the presence of tricarbonyl-(triphenylphosphine)nickel to produce dimethylaniline.

14 Claims, No Drawing Figures

PREPARATION OF AROMATIC SECONDARY AND TERTIARY AMINES USING A NICKEL COMPLEX CATALYST

BACKGROUND OF THE INVENTION

1. Field of the Invention

This invention relates to the preparation of aromatic secondary and aromatic tertiary amines. More specifically, it relates to a displacement process whereby aromatic halogen is displaced by a monohydrocarbylamino or preferably, a di(hydrocarbyl)amino group. The hydrocarbylamino compounds may be aliphatic or aromatic.

2. Prior Art

The prior art discloses amination of chlorobenzene catalyzed by various reduced metals and their salts. For example, A. M. Howald et al. [Ind. Eng. Chem. 15, 397 (1923)] teach the use of reduced nickel supported on pumice. The yields of aniline ranged from 1–5.8%.

W. Prahl et al. (U.S. Pat. No. 2,001,284) disclose the use of copper phosphite, tungstate, phosphotungstate, phosphomolybdate and phosphovanadate as catalysts and add that copper, nickel and iron salts of the Group V and VI metal oxides show similar activity.

E. C. Hughes et al. [Ind. Eng. Chem. 42, 787 (1950)] report the production of N-methylaniline from chlorobenzene and methylamine to be catalyzed by various metal halides and oxides, such as cupric, silver, nickel, zinc, cadmium, chromium and cobalt chlorides.

DESCRIPTION OF THE INVENTION

It has now been found that an aromatic secondary or aromatic tertiary amine may be prepared by the process which comprises the step of contacting a. an aromatic halide of the formula ArX wherein Ar is an aromatic ring group containing 4–20 carbon atoms and such groups substituted with up to 2 annular O, N or S atoms, each ring having 5 or 6 atoms, X is chlorine, bromine or iodine; with b. an amino compound of the formula $R^1R^2NH$ wherein $R^1$ is H or alkyl of 1 to 4 carbon atoms, except that it is not H where X is bromine or iodine; $R^2$ is alkyl of 1 to 4 carbon atoms or aryl of 6–10 carbon atoms, with the proviso that $R^1$ and $R^2$ together can form a ring structure containing up to 8 carbon atoms and such ring structures containing an alkyl substituent of 1 to 4 carbon atoms;

c. in the presence of a catalytically effective amount of a catalyst complex having a formula selected from the group I) 

wherein $L^1$ and $L^2$, individually, are monodentate organic ligands selected from the group $R_3P$, $R_2P(OR)$, $RP(OR)_2$, $P(OR)_3$, $R_2P(SR)$, $RP(SR)_2$, $P(SR)_3$, and when taken together are bidentate organic ligands selected from the group $R_2P(CH_2)_nPR_2$, and cyclooctadiene;

$m$ is zero or one;

$R^3$ and $R^4$, individually, are selected from the group $R_3P$, $R_2P(OR)$, $RP(OR)_2$, $P(OR)_3$, $R_2P(SR)$, $RP(SR)_2$, $P(SR)_3$, Cl⁻ and Br⁻; and when taken together are selected from the group $R_2P(CH_2)_nPR_2$, cyclooctadiene, and acetylacetonate; each R is aryl of 6–10 carbons or alkyl of 1–4 carbons;

and $n = 1$ to 3; and

II) 

wherein $L^1$, $L^2$, $L^3$ and $L^4$ have the values recited above for $L^1$ and $L^2$ and additionally may each be CO, with the proviso that at least one L is CO;

at a temperature range of 25°–250°C, using an amine to aromatic halide mole ratio of 2:1 to 10:1, and recovering an aromatic secondary or aromatic tertiary amine.

The reaction may be shown as

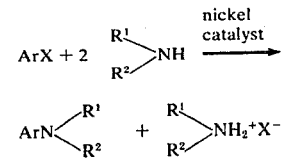

wherein Ar, X, $R^1$ and $R^2$ have the values stated above. The order of preference for X is chlorine, bromine, iodine.

Examples of Ar are groups obtained by removal of hydrogen from benzene, anthracene, phenanthrene, perylene, pyridine, furan, thiophene, phenanthridine, 1,5-phenanthroline, 1,8-phenanthroline, 4,5-phenanthroline, phenazine and the like. Compounds substituted in the meta and para positions are suitable if the substituents have $\sigma_p$ constants in the range −0.80 to +0.78 and $\sigma_m$ in the range −0.80 to +0.71 [H. Jaffe, Chem. Rev. 53, 191 (1953)].

Examples of hydrocarbylamino compounds ($R^1R^2NH$) are methylamine, ethylamine, propylamine, butylamine, dimethylamine, diethylamine, dipropylamine, dibutylamine, pyrrolidine, piperidine, aniline and the toluidines, xylidines and naphthylamines. The preferred process is that where $R^1$ is not H and the end product is an aromatic tertiary amine.

The reaction temperature is 25°–250°C. with temperatures of 100°–250°C. being generally employed. A preferred range is 190°–230°C.

The time necessary for complete reaction can range up to 1 day but under optimum conditions the reaction is substantially complete in 4–6 hours.

The halogen displacement reaction uses 2 moles of amine to form the arylamine and the by-product amine hydrohalide. The amine may also be used as a recoverable solvent and when used in excess tends to speed up the reaction. A mole ratio of amine to aromatic halide of 2:1 to 10:1 is generally employed with a ratio of 5:1 to 10:1 being preferred.

Generally the amount of catalyst employed ranges from 0.2 to 1.0 mole percent, and preferably from 0.4–1.0 mole percent, based on the molar amount of aromatic halide to be aminated. Larger mole percentages of catalyst may be used.

The reaction is preferably carried out in excess of the amino compound as solvent. However, the lower alcohols, e.g., ethanol and other alcohols containing up to 4 carbon atoms, ethers such as diethyl ether, tetrahydrofuran, dioxane, aliphatic and aromatic hydrocarbons containing up to 10 carbon atoms are also useful as solvents. Water can serve as a reaction medium, especially if the aromatic halide is sufficiently soluble.

The catalysts used in the practice of this invention are generally known. The preparation of these complexes are described in the following references:

J. R. Olechowski, J. Orgmet. Chem. 32, 269 (1971)
  Carbonyltris(triphenyl phosphite)nickel
  Dicarbonylbis(triphenyl phosphite)nickel C. A. Tolman et al., J. Am. Chem. Soc. 94, 2669 (1972)
  Tris(triphenylphosphine)nickel L. S. Meriweather & M. L. Fiene, J. Am. Chem. Soc. 81, 4200 (1959)
  Dicarbonylbis(triphenylphosphine)nickel filtered. The hexane wet cake was then dried in a vacuum oven to give 990 g (85%) of the complex, m.p. 98°–99° (reported 98.5°) found to be 98% pure by IR analysis (see below). The remaining 2% was found to be tetrakis(triphenyl phosphite)nickel(0).

The reaction may be carried out in benzene as solvent to give a 65% yield of complex, m.p. 97°–98°, or in 1,5-cyclooctadiene as solvent to give an 81% yield of complex, m.p. 98°–99.5° (Found C, 56.19; H,3.58: Ni, 4.96; P,7.47. $O_{55}H_{45}NiO_{10}P_3$; calcd.: C, 56.58; H, 3.86; Ni, 5.03; P, 7.95%).

The individual phosphine ligands, $R_3P$, include triethylphosphine, tri-n-propylphosphine, tri-n-butylphosphine, tri-α-naphthylphosphine, and tri-p-tolylphosphine, in the foregoing nickel compounds.

Examples of suitable nickel complexes, with those presently preferred denoted by an asterisk, are listed in Table I.

TABLE I

| | $L^1$ | $L^2$ | $L^3$ | $L^4$ | $R^3$ | $R^4$ |
|---|---|---|---|---|---|---|
| *Dicarbonyl[ethylenebis(diphenyl (phosphine)]nickel | CO | CO | $(C_6H_5)_2PCH_2CH_2P(C_6H_5)_2$ | — | — | — |
| *Tricarbonyl(triphenylphosphine)-nickel | CO | CO | CO | $(C_6H_5)_3P$ | — | — |
| *Dicarbonylbis(triphenylphosphine) nickel(II) | CO | CO | $(C_6H_5)_3P$ | $(C_6H_5)_3P$ | — | — |
| Dichlorobis(triphenylphosphine)-nickel(II) | $(C_6H_5)_3P$ | $(C_6H_5)_3P$ | — | — | Cl | Cl |
| Dibromobis(triphenylphosphine)-nickel(II) | $(C_6H_5)_3P$ | $(C_6H_5)_3P$ | — | — | Br | Br |
| Tris[tri(o-tolyl) phosphite] nickel | $(o-CH_3C_6H_4O)_3P$ | $(o-CH_3C_6H_4O)_3P$ | — | — | $(o-OCH_3C_6H_4O)_3P$ | — |
| Bromotris(triphenylphosphine)-nickel (I) | $(C_6H_5)_3P$ | $(C_6H_5)_3P$ | — | — | Br | $(C_6H_5)_3P$ |
| Tetrakis(triphenylphosphine)-nickel | $(C_6H_5)_3P$ | $(C_6H_5)_3P$ | $(C_6H_5)_3P$ | $(C_6H_5)_3P$ | — | — |
| *Tetracarbonylnickel | CO | CO | CO | CO | — | — |
| *Tricarbonyl(triphenyl phosphite)-nickel | CO | CO | CO | $(C_6H_5O)_3P$ | — | — |
| *Dicarbonylbis(triphenyl phosphite nickel | CO | CO | $(C_6H_5O)_3P$ | $(C_6H_5O)_3P$ | — | — |
| *Dicarbonylbis(triethyl phosphite)-nickel | CO | CO | $(C_2H_5O)_3P$ | $(C_2H_5O)_3P$ | — | — |
| *Carbonyltris(triphenyl phosphite)-nickel | CO | $(C_6H_5O)_3P$ | $(C_6H_5O)_3P$ | $(C_6H_5O)_3P$ | — | — |

Tricarbonyl(triphenylphosphine)nickel
Dicarbonylbis(triphenyl phosphite)nickel
Dicarbonylbis(triethyl phosphite)nickel
Tricarbonyl(triethyl phosphite)nickel
Carbonyltris(triethyl phosphite)nickel
Dicarbonylbis(tri-n-butylphosphine)nickel L. Malatesta & A. Sacco, Ann. Chim. (Rome) 44, 134 (1954)

H. W. B. Reed, J. Chem. Soc. 1931 (1934)

M. Hidai et al. J. Orgmet. Chem. 30, 279 (1971)

One method of preparing the nickel catalyst complexes is that shown in Olechowski, which shows the preparation of carbonyltris(triphenyl phosphite)nickel:

Into a clean, dry one-gallon autoclave was placed 257 g (1.0 mole) of anhydrous nickel acetylacetonate, 1000 ml of n-hexane, 1241 g (4.0 mole) of redistilled triphenyl phosphite and 1410 g (2.5 mole) of a 20% solution of triethylaluminum in hexane. The temperature of the reactor was raised to 85° and 28 g (1.0 mole) of carbon monoxide was added. After the reaction was complete (2 hours), as evidenced by no residual pressure in the system, the contents were cooled to 0° and the carbonyltris(triphenyl phosphite)-nickel was allowed to settle from the system over a period of 1 hour. The hexane was decanted and the residual complex was Additional examples of preferred nickel catalysts are tricarbonyl(n-propyl di-n-propylphosphinite)nickel, tricarbonyl-(n-butyl di-n-butylphosphinite)nickel, tricarbonyl(n-butyl di-n-propylthiophosphinite)nickel, tricarbonyl(n-butyl di-n-butylthiophosphinite)nickel, dicarbonylbis(diethyl 1-naphthylphosphonite)nickel, dicarbonylbis(diethyl ethylphosphonite)-nickel, dicarbonylbis(isobutyl di-n-butylphosphinite)nickel, dicarbonylbis(n-propyl di-n-propylphosphinite)nickel, dicarbonylbis(i-butyl di-n-butylthiophosphinite)nickel, dicarbonylbis-(n-propyl diethylthiophosphinite)nickel, dicarbonylbis(triethyl phosphite)nickel, dicarbonylbis(tributyl phosphite)nickel, dicarbonylbis(tripropyl phosphite)nickel, dicarbonylbis(tri-p-chlorophenyl phosphite)nickel, dicarbonylbis(triisopropyl phosphite)nickel, dicarbonylbis(tributyl thiophosphite)-nickel, dicarbonylbis(di-n-butyl butylphosphonite)-nickel, dicarbonylbis-(di-n-butyl butylthiophosphonite)nickel, dicarbonyl[ethylenebis(diethylphosphine)]nickel, dicarbonyl[1,3-trimethylenebisdiphenylphosphine)]nickel, dicarbonyl[methylenebis(-diphenylphosphine)]nickel, dicarbonyl(1-ethylphenylphosphino-2-diphenylphosphinoethane)-nickel, and dicarbonyl(1-isobutylphenylphosphino-3-diphenylphosphinopropane)nickel.

SPECIFIC EMBODIMENTS OF THE INVENTION

The following are illustrative examples in which all parts or percentages are by weight and all temperatures are degrees centigrade unless otherwise stated.

EXAMPLE 1

A. A 80-cc Hastelloy-C lined autoclave was charged with 11.26 g (100 mmoles) of chlorobenzene and 1.0 g (2.5 mmoles) of tricarbonyl(triphenylphosphine)-nickel. The autoclave was closed, cooled in Dry Ice-/acetone and evacuated to about 20 mm. The autoclave was connected to a source of dimethylamine and 17.0 g (380 mmoles) of the latter added to the autoclave. The autoclave and contents were heated to 230° for 6 hours. The reaction mixture was diluted to 25 ml with benzene and resultant solution analyzed by gas-liquid partition chromatography (glpc).

The glpc analysis was carried out on a 4 foot by ¼ inch column packed with 20% Triton X-305 on Chromsorb W using helium as carrier gas at 75 cc/minute and operating at a column temperature of 200°C. Comparison with standard solutions of dimethylaniline showed that the conversion of chlorobenzene to dimethylaniline was 30% of the theoretical.

B. A control experiment carried out as above, but omitting the tricarbonyl(triphenylphosphine)nickel, showed a conversion of chlorobenzene to dimethylaniline of only 0.25%.

C. Example 1-A was repeated and the reaction mixture fractionally distilled to obtain 4.79 g (39% conversion) of dimethylaniline boiling at 68°–70.5°C/9 mm. The dimethylaniline was further characterized by nuclear magnetic resonance (nmr) and infrared (ir) spectroscopy.

EXAMPLE 2

The following experiments were carried out as in Example 1-A except for substitution of the various nickel complexes for the tricarbonyl(triphenylphosphine)-nickel.

TABLE II

| Nickel Complex | Wt.(g) | mmole | Conversion of Chlorobenzene to Dimethylaniline % |
|---|---|---|---|
| A None | — | — | 0.34 |
| B Ni(CO)$_3$(PΦ$_3$) | 0.81 | 2.0 | 40.0 |
| C Ni(CO)$_2$(PΦ$_3$)$_2$ | 1.28 | 2.0 | 20.0 |
| D NiCl$_2$(PΦ$_3$)$_2$ | 0.78 | 1.0 | 25.0 |
| E Ni[(o-tolylO)$_3$P]$_3$ | 1.12 | 1.0 | 5.0 |
| F Ni(PΦ$_3$)$_4$ | 1.12 | 1.0 | 8.0 |
| G Ni(CO)$_4$ | 0.172 | 1.0 | 23.0 |
| H Ni(PEt$_3$)$_4$ | 0.53 | 1.0 | 12.0 |
| I Ni(COD)$_2$ (1) | 0.26 | 1.0 | 1.5 |
| J (2) | 0.91 | 1.8 | 50.0 |
| K Ni(CO)$_3$[P(OΦ)$_3$] | 0.95 | 1.0 | 8.0 |
| L Ni(CO)$_3$(PΦ$_3$) | 0.90 | 1.0 | 30.0 |

(1) COD = cyclooctadiene.
(2) Dicarbonyl[ethylenebis(diphenylphosphine)]nickel.

EXAMPLE 3

The following experiments compare the catalytic activity of dicarbonyl[ethylenebis(diphenylphosphine)]-nickel with commonly employed nickel and cuprous chlorides at various temperatures and with dimethylamine and methylamine.

These reactions were carried out in 5 ml heavy walled glass ampoules. The ampoules were charged with the catalyst shown in the tables and a monohalobenzene. The ampoules were next connected to a vacuum line, chilled in liquid nitrogen, degassed, charged with the selected amine and sealed (liquid nitrogen temperature). Groups of ampoules so prepared were placed in a 400 cc autoclave with 200 ml of methanol or water to serve as a heat-transfer agent. The autoclave was closed and nitrogen added to 2000 psig to prevent rupture of the glass ampoules and heated at the temperatures shown in Table III.

TABLE III

| Chlorobenzene/Dimethylamine 0.238 g/0.95 g Complex | g. | Temp. | % Yield of Substituted Aniline | % Recovery Halobenzene |
|---|---|---|---|---|
| A None | — | 200 | 0.2 | 83 |
| B None | — | 160 | 0.015 | 84 |
| C NiCl$_2$ | 0.027 | 160 | 0.42 | 64 |
| D (1) | 0.084 | 160 | 3.0 | 85 |
| E CuCl | 0.0209 | 160 | <0.20 | 70 |
| Chlorobenzene/Methylamine 0.238 g/0.655 g | | | | |
| F None | — | 200 | 0.05 | 96 |
| G NiCl$_2$ | 0.027 | 200 | 2.7 | 91 |
| H (1) | 0.084 | 200 | 15.0 | 79 |
| I CuCl | 0.0209 | 200 | 4.4 | 85 |
| Bromobenzene/Dimethylamine 0.332 g/0.95 g | | | | |
| J None | — | 190 | 3.0 | 90 |
| K NiCl$_2$ | 0.027 | 190 | 68.0 | <0.001 |
| L (1) | 0.084 | 190 | 84.0 | <0.001 |
| M CuCl | 0.0209 | 190 | 2.4 | 90 |
| Bromobenzene/Methylamine 0.332 g/0.655 g | | | | |
| N — | — | 170 | 0.16 | 99 |
| O NiCl$_2$ | 0.027 | 170 | 0.47 | 99 |
| P (1) | 0.084 | 170 | 1.5 | 93 |
| Q CuCl | 0.0209 | 170 | 81.0 | 0.32 |
| Iodobenzene/Dimethylamine 0.431 g/0.95 g | | | | |
| R None | — | 190 | 5.2 | 97 |
| S NiCl$_2$ | 0.027 | 190 | 12.0 | 0.2 |
| T (1) | 0.084 | 190 | 54.0 | <0.001 |
| U CuCl | 0.0209 | 190 | 4.2 | 87 |
| Iodobenzene/Methylamine 0.431 g/0.655 g | | | | |
| V None | — | 160 | 0.42 | 99 |
| W NiCl$_2$ | 0.027 | 160 | 0.51 | 67 |
| X (1) | 0.084 | 160 | 3.9 | 86 |
| Y CuCl | 0.0209 | 160 | 97.0 | 4 |

(1) Dicarbonyl[ethylenebis(diphenylphosphine)]nickel.

EXAMPLE 4

Each of two 5 cc (total volumes within ± 1%) heavy walled ampoules was charged with 0.343 g (2.115 mmoles) of 1-chloronaphthalene and one ampoule was also charged with 0.0102 g of dicarbonyl[ethylenebis(diphenylphosphine)]nickel. Both ampoules were degassed in a vacuum line and 515 ml (0.95 g, 21.15 mmoles) of gaseous dimethylamine was condensed into each ampoule and the ampoule sealed. The above ampoules were placed in a 400 cc autoclave containing 200 cc of water to aid heat-transfer. The autoclave was closed and nitrogen added to 2000 psi to prevent rupture of the ampoules. The autoclave and contents were heated at 200°C for 6 hours.

The autoclave was cooled, the ampoules removed, cooled to about −100°C in liquid nitrogen and opened. The dimethylamine was allowed to evaporate and the resultant reaction mixture diluted with 1.00 ml of a standard solution of two molar bromobenzene in hexane. The diluted reaction mixtures were analyzed (glpc).

The product from the experimental ampoule showed that 26.5% conversion of 1-chloronaphthalene to 1-dimethylaminonaphthalene had occured and that 64% of the 1-chloronaphthalene was recovered. The material from the control ampoule showed 0.67% conversion to 1-dimethylaminonaphthalene and 94% recovery of the 1-chloronaphthalene.

prepared as in Example 4 and heated at 200°C for 6 hours. Analysis by glpc showed the following results in Table V.

TABLE V

|  | A | B | C | D | E | F | G |
|---|---|---|---|---|---|---|---|
| Chlorobenzene (g) | 0.239 | — | — | — | — | — | — |
| o-Chlorotoluene (g) | — | 0.268 | — | — | — | — | — |
| m-Chlorotoluene (g) | — | — | 0.268 | — | — | — | — |
| p-Chlorotoluene (g) | — | — | — | 0.268 | — | — | — |
| p-Chloroanisole (g) | — | — | — | — | 0.305 | — | — |
| *p-Dichlorobenzene (g) | — | — | — | — | — | 0.310 | — |
| 4-Chlorobiphenyl (g) | — | — | — | — | — | — | 0.398 |
| Dicarbonyl[ethylenebis(diphenylphosphine)]nickel (g) | 0.0102 | 0.0102 | 0.0102 | 0.0102 | 0.0102 | 0.0102 | 0.0102 |
| Dimethylamine (g) | 0.95 | 0.95 | 0.95 | 0.95 | 0.95 | 0.95 | 0.95 |
| **Conversion (%) | 24.0 | 0.10 | 31.0 | 20.0 | 9.3 | 58.0 | 41.0 |

The identities of the substituted dimethylanilines were confirmed by glpc and mass spectra analysis.
*In this reaction the formation of p-bis(dimethylamino)benzene (0.08 mmole) was also observed. This substance was analyzed by glpc/mass spectra and found to have the correct mass number.
**Control experiments employing no catalyst gave negligible conversions.

EXAMPLE 5

The effect of solvents on the amination is illustrated by the following experiments. Thick walled glass ampoules were charged as follows:

TABLE IV

|  | A | B | C | D |
|---|---|---|---|---|
| Chlorobenzene (g) | 0.239 | 0.239 | 0.239 | 0.239 |
| Dimethylamine (g) | 0.95 | 0.95 | 0.95 | 0.95 |
| Dicarbonyl[ethylenebis(diphenylphosphine)]nickel (g) | — | 0.0102 | — | 0.0102 |
| Ethanol (ml) | 1.0 | 1.0 | — | — |
| Tetrahydrofuran (ml) | — | — | 1.0 | 1.0 |

After having been heated at 200°C for 6 hours, the reaction mixtures were analyzed as in Example 4; the conversions to dimethylaniline and chlorobenzene recovery were:

|  | Conversion to Dimethylaniline (%) | Recovery of Chlorobenzene |
|---|---|---|
| A | <0.20 | 99 |
| B | 21.50 | 77 |
| C | 0.43 | 99 |
| D | 40.00 | 57 |

EXAMPLE 6

The invention is further illustrated by the following examples in which the monohalohydrocarbon is replaced by a substituted chlorobenzene. Ampoules were

EXAMPLE 7

The applicability of this invention to cyclic secondary amines is shown by the reaction with piperidine. The reactions were carried out in heavy walled glass ampoules as described in Example 4. This experiment also shows the superiority of one of the most preferred catalysts. The ampoules were charged as follows:

|  | GRAMS | |
|---|---|---|
|  | A | B |
| Piperidine | 1.59 | 1.59 |
| Bromobenzene | 0.294 | 0.293 |
| Bis(2,4-pentanedionato)nickel(II) | 0.0048 | — |
| Dicarbonyl[ethylenebis(diphenylphosphine)]nickel | — | 0.0096 |

The ampoules were chilled, degassed and sealed as in Example 4. The sealed ampoules were heated in an oil bath at 160°C for 4 hours. The ampoules were cooled to room temperature, opened, and the contents diluted with 50μl of p-chloroanisole to serve as an internal glpc standard. The glpc analysis showed that A reaction gave 0.5% conversion to N-phenylpiperidine, while B reaction gave almost 82% conversion of bromobenzene to N-phenylpiperidine.

EXAMPLE 8

The procedure of Example 4 was followed in carrying out the following experiments at 200°C for 6 hours. The data are given in Table VI.

TABLE VI

|  | GRAMS | | | | | |
|---|---|---|---|---|---|---|
|  | 1 | 2 | 3 | 4 | 5 | 6 |
| Chlorobenzene | 0.239 | 0.239 | 0.239 | — | — | — |
| Bromobenzene | — | — | — | 0.328 | 0.328 | 0.328 |
| Ethylamine | 0.955 | 0.955 | 0.955 | 0.955 | 0.955 | 0.955 |
| *NiCl$_2$ | — | 0.0027 | — | — | — | — |
| *NiBr$_2$ | — | — | — | — | 0.0046 | — |
| Dicarbonyl[ethylenebis(diphenylphosphine)]nickel | — | — | 0.0108 | — | — | 0.0108 |
| Conversion to N-ethylaniline (%) | <0.05 | 0.12 | 4.11 | 0.19 | 0.9 | 14.6 |
| Recovery of halobenzene (%) | 97.0 | 97.0 | 84.0 | ca 100 | 100 | 98.0 |

*Prior art catalyst

EXAMPLE 9

The following experiments were carried out as in Example 4. The reactions were effected at 230°C for 6 hours.

TABLE VII

|  | GRAMS | | | | | |
|---|---|---|---|---|---|---|
|  | 1 | 2 | 3 | 4 | 5 | 6 |
| Chlorobenzene | 0.239 | 0.239 | 0.239 | — | — | — |
| Bromobenzene | — | — | — | 0.328 | 0.328 | 0.328 |
| Aniline | 1.96 | 1.96 | 1.96 | 1.96 | 1.96 | 1.96 |
| *$NiCl_2$ | — | 0.0027 | — | — | — | — |
| *$NiBr_2$ | — | — | — | — | 0.0086 | — |
| Dicarbonyl[bis(diphenyl-phosphino)ethane nickel | — | — | 0.0108 | — | — | 0.0108 |
| Conversion to diphenyl-amine (%) | 0.12 | 3.8 | 9.0 | 2.9 | 13.6 | 31.3 |
| Recovery of halobenzene (%) | 96.0 | 96.0 | 99.0+ | 97.0 | 90.0+ | 81.0+ |

*Prior art catalyst
+Indicates a high value due to faulty glpc analysis.

EXAMPLE 10

The following experiments were carried out at 170°C for 6 hours and followed the procedure of Example 4.

TABLE VIII

|  | GRAMS | | | | | |
|---|---|---|---|---|---|---|
|  | 1 | 2 | 3 | 4 | 5 | 6 |
| Bromobenzene | 0.328 | 0.328 | 0.328 | 0.328 | 0.328 | 0.328 |
| Dimethylamine | 0.955 | 0.955 | 0.955 | 0.955 | 0.955 | 0.955 |
| Dicarbonyl[ethylene-bis-(diphenylphosphine)]nickel | — | 0.0011 | 0.0022 | 0.0044 | 0.0077 | 0.0109 |
| Conversion to dimethyl-aniline (%) | 1.42 | 56.5 | 78.0 | 91.0 | 94.0 | 93.0 |
| Recovery of bromobenzene (%) | 95.0 | 35.0 | 13.0 | <0.5 | <0.5 | <0.5 |

EXAMPLE 11

This set of experiments, carried out as in Example 4, shows the relative efficacies of several of the preferred catalysts. Each ampoule was charged with 0.239 g of chlorobenzene, 0.955 g of dimethylamine and the weight of catalyst shown below. The ampoules and contents were heated at 170°C for 6 hours.

TABLE IX

| Catalyst (g) | Conversion to Dimethyl-aniline (%) | Recovery of Chloroben-zene (%) |
|---|---|---|
| Dicarbonyl bis-(triphenylphos-phine)nickel (0.0135) | 24.0 | 71 |
| Dicarbonyl [ethylenebis (diphenylphos-phine)]nickel (0.0108) | 15.0 | 61 |
| Carbonyl tris (triethylphos-phine)nickel (0.0074) | 22.0 | 72 |
| Dicarbonyl bis (triphenyl phos-phite)nickel (0.0155) | 26.0 | 66 |
| Dicarbonyl bis (triphenyl-phos-phite)nickel (0.0155) | 6.7 | 86 |
| Carbonyl tris (triphenyl phos-phite)nickel (0.0218) | 4.9 | 88 |
| Tetracarbonyl-nickel (0.0036) | 15.0 | 61 |

EXAMPLE 12

Demonstration that haloheterocyclic aromatic compounds undergo the reaction of this invention is in the following experiments. Heavy walled glass ampoules were charged with the components listed, the mixture degassed and treated essentially as in Example 4. The following compositions were heated at 150°C for 6 hours and the products analyzed by glpc.

TABLE X

|  | A | B |
|---|---|---|
| 3-Chloropyridine (g) | 0.242 | 0.242 |
| Dimethylamine (g) | 0.968 | 0.968 |
| Dicarbonyl[ethylenebis (diphenylphosphine)] nickel (g) | 0.0155 | — |
| Ethanol (ml) | 1.2 | 1.2 |
| Product | | |
| (1) Dimethylamine | *2170 | *2042 |
| (2) 3-Chloropyridine | * 992 | *1024 |
| (3) 3-Dimethylamino-pyridine | * 82 | * 0 |

*Absolute peak areas by glpc. This is a qualitative measure and shows that none of product (3) was produced in the absence of the nickel (0) catalyst whereas about 10% of product (3) was produced when the nickel(0) catalyst was present.

EXAMPLE 13

This set of experiments shows the minor effect of air when the reaction is cocatalyzed by the nickel complex as compared with the cuprous chloride reaction. The reaction mixtures in sealed glass ampoules were heated at 200° for 6 hours.

TABLE XI

|  | A | B | C | D |
|---|---|---|---|---|
| Chlorobenzene(mg) | 237 | 237 | 237 | 237 |
| Methylamine(mg) | 650 | 650 | 650 | 650 |
| Air(mmole) | — | 0.025 | — | 0.025 |
| Dicarbonylbis(tri-phenylphosphine) nickel (mg) | 13.5 | 13.5 | — | — |
| *Cuprous chloride (mg) | — | — | 2.1 | 2.1 |
| % Conversion to N-methylaniline | 9.8 | 4.2 | 7.1 | 7.6 |
| % Recovery of chlorobenzene | 80 | 82 | 83 | 81 |

EXAMPLE 14

The following experiments show the advantageous effect of air on the dimethylamination of chlorobenzene. These were carried out by the general procedure of Example 4 and the mixtures were heated at 190° for 6 hours.

|  | A | B |
|---|---|---|
| Chlorobenzene (mg) | 237 | 237 |
| Dimethylamine (mg) | 950 | 950 |
| Air | — | (ca 0.025 mmole)* |
| Dicarbonylbis(triphenylphosphine)nickel (mg) | 13.5 | 13.5 |
| % Conversion to dimethylaniline | 2.08 | 31.5 |
| % Recovery of chlorobenzene | 87 | 60 |

*ca. 3 cc of air at 1 atmosphere.

EXAMPLE 15

This example shows that the amination of bromobenzene occurs, even though slowly, at room temperature. A solution containing 1.86 g of piperidine, 0.197 g of bromobenzene and 0.12 g of dicarbonylbis(triphenylphosphine)-nickel was allowed to stand at 24°–26° for 17 days along with a control that contained no catalyst. Analysis showed that the catalyzed reaction occurred to the extent of 0.45% conversion and the control gave practically no evidence (<0.1% conversion) of reaction.

EXAMPLE 16

The following reaction mixtures were heated at 230° for 6 hours.

|  | GRAMS | | | |
|---|---|---|---|---|
|  | A | B | C | D |
| Bromobenzene | 0.315 | 0.315 | 0.315 | 0.315 |
| Dipropylamine | 1.175 | 1.175 | — | — |
| Dibutylamine | — | — | 1.37 | 1.37 |
| Dicarbonylbis(triphenylphosphine)nickel | — | 0.0133 | — | 0.0133 |
| % Conversion to N,N-dialkylaniline | <0.10 | 38.0 | <0.10 | 11.7 |

The products were characterized by glpc and mass spectral analyses.

I claim:

1. The process of preparing an aromatic secondary or aromatic tertiary amine which comprises the step of contacting
   a. an aromatic halide of the formula ArX wherein
      Ar is an aromatic ring group containing 4–20 carbon atoms and such groups substituted with up to 2 annular O, N or S atoms, each ring having 5 or 6 atoms,
      X is chlorine, bromine or iodine; with
   b. an amino compound of the formula $R^1R^2NH$ wherein
      $R^1$ is H or alkyl of 1 to 4 carbon atoms, except that it is not H where X is bromine or iodine;
      $R^2$ is alkyl of 1 to 4 carbon atoms or aryl of 6–10 carbon atoms, with the proviso that $R^1$ and $R^2$ together can form a ring structure containing up to 8 carbon atoms and such ring structures containing an alkyl substituent of 1 to 4 carbon atoms;
   c. in the presence of a catalytically effective amount of a catalyst complex having a formula selected from the group I) 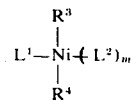

wherein
   $L^1$ and $L^2$, individually, are monodentate organic ligands selected from the group $R_3P$, $R_2P(OR)$, $RP(OR)_2$, $P(OR)_3$, $R_2P(SR)$, $RP(SR)_2$, $P(SR)_3$, and when taken together are bidentate organic ligands selected from the group $R_2P(CH_2)_nPR_2$ and cyclooctadiene;
   $m$ is zero or 1;
   $R^3$ and $R^4$, individually, are selected from the group $R_3P$, $R_2P(OR)$, $RP(OR)_2$, $P(OR)_3$, $R_2P(SR)$, $RP(SR)_2$, $P(SR)_3$, $Cl^-$ and $Br^-$; and when taken together are selected from the group $R_2P(CH_2)_nPR_2$, cyclooctadiene and acetylacetonate; each R is aryl of 6–10 carbons or alkyl of 1–4 carbons; and $n = 1$ to 3; and (II) 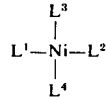

wherein
   $L^1$, $L^2$, $L^3$ and $L^4$ have the values recited above for $L^1$ and $L^2$ and additionally may each be CO, with the proviso that at least one L is CO;
   at a temperature range of 25°–250°C, using an amine to aromatic halide mole ratio of 2:1 to 10:1, and recovering an aromatic secondary or aromatic tertiary amine.

2. A process according to claim 1 in which the catalyst complex has the formula I.

3. A process according to claim 1 in which the catalyst complex has the formula II.

4. The process of claim 3 in which X is chlorine or bromine, $R^1$ is other than H, and an aromatic tertiary amine is recovered.

5. The process of claim 3 in which the temperature range is 100°–250°C.

6. The process of claim 3 in which the temperature range is 190°–230°C.

7. The process of claim 3 in which the mole ratio of amine to aromatic halide is 5:1 to 10:1.

8. The process of claim 3 in which the reactants are chlorobenzene and dimethylamine.

9. The process of claim 3 in which the reactants are chlorobenzene and diethylamine.

10. The process of claim 3 in which the catalyst complex is dicarbonylnickel.

11. The process of claim 3 in which the catalyst complex is tricarbonyl(triphenylphosphine)nickel.

12. The process of claim 3 in which the catalyst complex is dicarbonylbis(triphenylphosphine)nickel.

13. The process of claim 3 in which the catalyst complex is tetracarbonylnickel.

14. The process of claim 3 in which the catalyst complex is dicarbonylbis(triphenyl phosphite)nickel.

* * * * *

UNITED STATES PATENT OFFICE
CERTIFICATE OF CORRECTION

PATENT NO. : 3,914,311
DATED : October 21, 1975
INVENTOR(S) : Dale Robert Coulson It is certified that error appears in the above–identified patent and that said Letters Patent are hereby corrected as shown below:

Claim 10, line 2 "dicarbonylnickel" should be

--dicarbonyl[ethylenebis(diphenylphosphine)] nickel--.

Signed and Sealed this

Twentieth Day of July 1976

[SEAL]

Attest:

RUTH C. MASON
*Attesting Officer*

C. MARSHALL DANN
*Commissioner of Patents and Trademarks*